United States Patent [19]

Matsuzawa

[11] Patent Number: 4,839,763
[45] Date of Patent: Jun. 13, 1989

[54] COMPOSITE MAGNETIC HEAD CORE

[75] Inventor: Soichiro Matsuzawa, Kuwana, Japan

[73] Assignee: NGK Insulators, Ltd., Japan

[21] Appl. No.: 100,230

[22] Filed: Sep. 23, 1987

Related U.S. Application Data

[63] Continuation-in-part of Ser. No. 688,502, Jan. 2, 1985, Pat. No. 4,711,018.

[30] Foreign Application Priority Data

Jan. 14, 1984 [JP] Japan .................................. 59-5203
Jan. 14, 1984 [JP] Japan .................................. 59-5204

[51] Int. Cl.4 ............................................ G11B 5/147
[52] U.S. Cl. .................................... 360/126; 360/121
[58] Field of Search ............... 360/110, 119, 120, 121, 360/123, 125, 126, 122; 29/603

[56] References Cited

U.S. PATENT DOCUMENTS 3,735,052 5/1973 Hoogendoorn et al. ............. 29/603
4,611,259 9/1986 Schiller ................................ 360/125

FOREIGN PATENT DOCUMENTS

2814744 10/1978 Fed. Rep. of Germany .
0205817 12/1982 Japan .
0005417 1/1984 Japan .
0150212 7/1985 Japan .
0150215 7/1985 Japan .
116451 8/1984 United Kingdom .

Primary Examiner—Stuart N. Hecker
Assistant Examiner—David J. Severin
Attorney, Agent, or Firm—Arnold, White & Durkee

[57] ABSTRACT

A composite magnetic head core, having a first and a second integral core assembly. Each core assembly includes a first ferrite core element having a C-shaped portion, and a second ferrite core element having a rectangular portion. The core elements are butted and bonded together, so as to close an opening of the C-shaped portion with the rectangular portion, to thereby form a generally annular magnetic circuit including a magnetic gap defined by opposed end portions of the two core elements at one end of the corresponding core assembly. Each core assembly has at least one inclined groove cut in the opposed end portions of the two ferrite core elements to define a width of at least one track, in a direction from the second core element toward the first core element, such that the depth of the inclined groove decreases toward the first ferrite core element and such that a depth of the inclined groove at the position corresponding to the magnetic gap is greater than a depth of the magnetic gap. The two integral core assemblies are butted and bonded together by an adhesive layer disposed between the second core elements, such that the inclined grooves in the two core assemblies are maintained in a predetermined positional relationship with each other. The grooves are filled with a suitable filler such as a glass.

7 Claims, 8 Drawing Sheets

COMPOSITE MAGNETIC HEAD CORE

This is a Continuation-in-Part of Application Ser. No. 688,502 filed Jan. 2, 1985 now U.S. Pat. No. 4,711,018.

BACKGROUND OF THE INVENTION

The present invention relates to a core of a magnetic head, and more particularly to a structure of a magnetic head core made of ferrite which is easy to manufacture and excellent in quality. The present invention is also concerned with a composite magnetic head core which consists of two ferrite cores bonded together.

Figure 1:
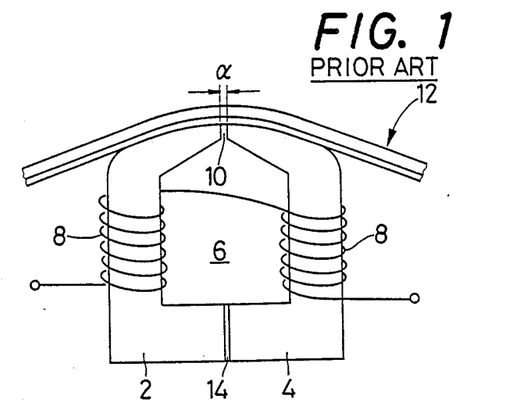
FIG. 1 is an illustration of a magnetic head arrangement known in the prior art.

In the art of magnetic heads, a core made of ferrite has been known, which generally consists of a pair of ferrite core elements joined together to form a structure of ring-shaped or toric cross section having a centrally located aperture or opening which facilitates winding of coils around the core elements. More specifically stated referring to FIG. 1 which shows a common type of magnetic head core, a pair of generally C-shaped ferrite core halves 2, 4 are butted together to form the core with a central aperture 6 which serves as a space for winding coils 8 around the core halves 2, 4. In this manner, an generally annular or toric magnetic path (magnetic circuit) is constituted by the two C-shaped ferrite core halves 2, 4. Additionally, the toric magnetic core structure is formed with a magnetic gap 10 at one end portion of the core. The gap 10 is formed to extend across the torus of the toric magnetic circuit and has a suitable width $a$. As is well known in the art, a magnetic tape 12, magnetic disk or other magnetic recording medium is slidably moved on outer contact surfaces on the core halves 2, 4 in the proximity of the magnetic gap 10 defined by these two halves 2, 4, whereby magnetic recording (writing) and reproducing (reading) operations are executed. As indicated above, the ends of the core halves 2, 4 at one end of the core define the magnetic gap 10, while the other ends of the core halves 2, 4 are bonded together with suitable bonding glass so as to maintain a generally annular or toroidal cross sectional shape of the magnetic core as a whole. In this manner of bonding of the core elements 2, 4, it is inevitable that a very small gap, so called a rear or back gap 14, is formed between the bonded surfaces of the core elements 2, 4.

In such a ferrite core as described above, a writing, reading or erasing track or tracks of a suitable width is/are provided on the contact surface on which a magnetic recording medium (12) is moved in sliding contact, i.e., on the outer surfaces of the opposed end portions of the two ferrite core elements 2, 4 in the vicinity of the magnetic gap 10. The track is formed so as to extend in the direction of movement of the recording medium. The width of the track is selected depending upon the specific magnetic recording medium (12) used. In a commonly known ferrite core, the width of the track is usually defined or determined by a central or middle groove or side grooves formed in the opposed end portions of the core elements 2, 4 defining the gap 10. The middle groove is located in the middle of the contact surface as viewed in the width direction perpendicular to the direction of sliding movement of the recording medium, so that two tracks are formed on both sides of the middle groove. On the other hand, a single track is defined by two side grooves which are formed on both sides of the track.

Figure 2A:
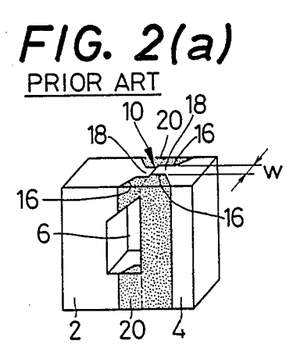
FIGS. 2(a), 2(b) and 2(d) are perspective views of known magnetic head cores.
Figure 2B:
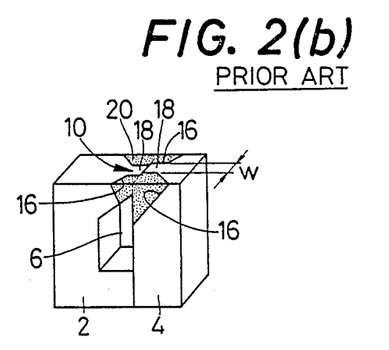

Examples of such grooves are shown in FIGS. 2(a) and 2(b), wherein two side grooves 16, 16 are formed in the opposed portions of the core elements 2, 4 which are located on both sides of the magnetic gap 10 to define the gap 10. The two side grooves 16, 16 define therebetween a track 18 having a suitable width w as measured perpendicularly to the direction of sliding movement of a magnetic recording medium. The two side grooves 16, 16 are filled with masses of glass 20 in order to protect the track 18 and its vicinities, and prevent otherwise possible breakage, chipping or similar damage to the corner portions defining the grooves 16, 16.

In this type of ferrite core wherein the grooves 16, 16 determine the width w of the track 18, the grooves 16, 16 are formed in each of the opposed end portions of the elements 2, 4 defining the magnetic gap 10 over a sufficient length. Further, each of the core elements 2, 4 should be processed, prior to bonding thereof, to provide two cutouts which eventually form the grooves 16, 16 when the elements 2, 4 are bonded together. This requires a cutting process to be done in each of the individual core elements 2, 4, and needs accurate control of the widths of the cutouts and the spacings between the cutouts in each core element 2, 4, so that the two halves of the track 18 are exactly aligned with each other to provide the predetermined width w on both of the core elements 2, 4.

Figure 2C:
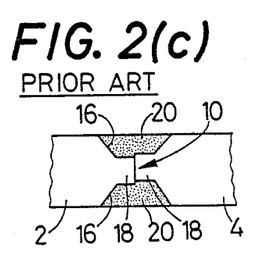
FIG. 2(c) is a fragmentary plan view of the cores of FIGS. 2(a) and (b), showing misalignment of core elements at the top of the core on which a track is formed.

In the above case wherein the two core elements 2, 4 are subjected to cutting operations to form the individual cutouts for the grooves 16, 16, it is required to precisely position the two elements 2, 4 upon bonding thereof to form an integral core structure, such that the two halves of the track 18 defined by the grooves 16, 16 are accurately aligned with each other. This alignment is a difficult and cumbersome step in the conventional process of manufacturing a known ferrite core. In other words, inaccurate relative positioning of the two core elements 2, 4 results in relative misalignment of the two halves of the track 18 at the interface of the core elements 2, 4 as illustrated in FIG. 2(c), thus leading to reduced quality of the ferrite core.

Figure 2D:
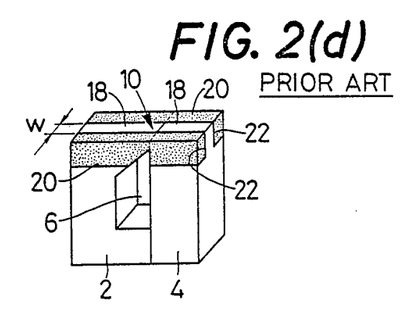

There is also known a ferrite core as shown in FIG. 2(d). Unlike the above-discussed ferrite core having the grooves 16, 16, this ferrite core has side grooves 22, 22 which are cut to extend along the length of the track 18. These parallel grooves 22, 22, are formed after the two core elements 2, 4 are bonded together. Thus, the grooves 22, 22 define a track 18 having a suitable width w and a desired length. However, since the grooves 22, 22 on both sides of the track 18 should have a depth sufficient to reach the coil-winding aperture 6, the uncut portions (lands) of the core elements 2, 4 providing the track 18 and defined by the deep parallel grooves 22, 22 tend to have a large height relative to its width. Stated differently, it is difficult to form the track 18 as designed, by cutting such deep parallel grooves without breakage or chipping of the uncut portions. This problem is aggravated as the width w of the track 18 is reduced. While the side parallel grooves 22, 22 defining the track 18 are filled with glass 20, as in the examples of FIGS. 2(a) and 2(b), it is recognized as another drawback that the glass 20 in its molten phase will easily flow down over the side end surfaces of the core elements 2, 4 beyond the longitudinal ends of the grooves 22 in the direction along the length of the track 18. Thus, the ferrite core of FIG. 2(d) has various drawbacks in its process of manufacture.

Figure 3A:
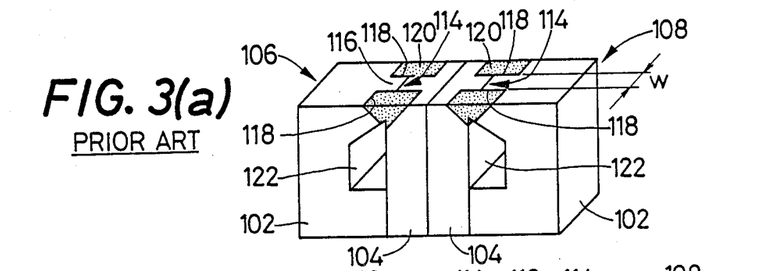
FIGS. 3(a), 3(b), 3(c) and 3(d) are perspective views of composite magnetic head cores known in the art.
Figure 3B:
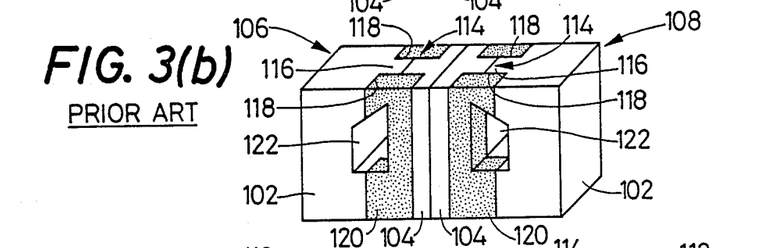
Figure 3C:
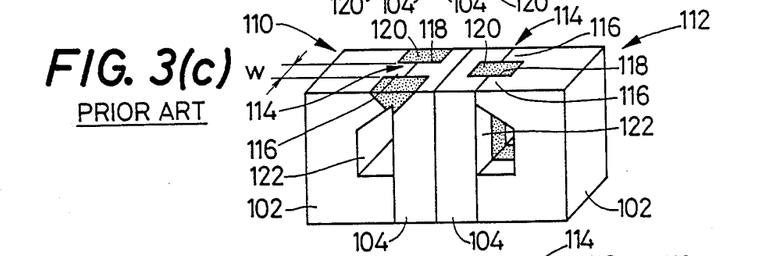
Figure 3D:
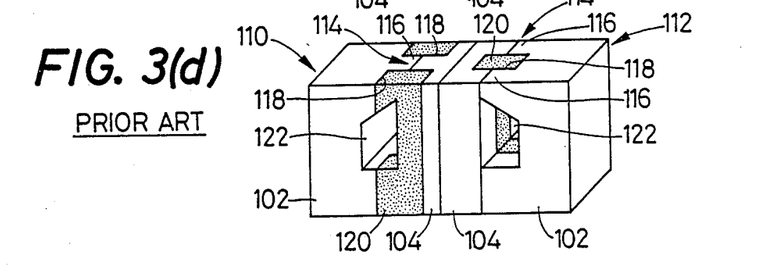

A ferrite magnetic head core as described above is used either alone, or as one of two elements of a composite maganetic head core which consists of a pair of such ferrite cores. Some examples of a composite core are illustrated in FIGS. 3(a) through 3(d). Each of the composite cores shown in FIGS. 3(a) and 3(b) is a composite which consists of a ferrite writing head core 106 consisting of an integral assembly of a C-shaped core element 102 and a rectangular core (I-shaped core) element 104, and a ferrite reading head core 108 consisting of another integral assembly of the same core elements 102, 104. FIGS. 3(c) and 3(d) show composite cores each of which is a composite of a ferrite writing/-reading head core 110 and a ferrite erasing head core 112, each core 110, 112 consisting of core elements 102, 104 which are similar to the core elements 102, 104 of the ferrite cores 106, 108 of FIGS. 3(a) and 3(b).

Each of the ferrite cores 106, 108, 110 and 112 has a magnetic gap 114 defined by opposed end portions of the core elements 102, 104 which provide contact surfaces on which a magnetic recording medium is moved in sliding contact. These contact surfaces on the opposed end portions in the vicinity of the magnetic gap 114, that is, the outer surfaces of the opposed end portions on both sides of the magnetic gap 114, is formed with a track or tracks 116 which extend in the direction of sliding movement of the magnetic recording medium, so that the recording medium moves in sliding contact with the tracks 116 for magnetic writing and reading operations. The width w of the tracks 116 is determined depending upon the specific kind of the recording medium. In known writing and/or reading head cores indicated at 106, 108, 110, the width of the track 116 is determined by two side grooves 118 which are formed in the opposed end portions of the core elements 102, 104 on both sides of the magnetic gap 114 such that the grooves 118 are located on both sides of the track 116 to define the track 116 therebetween, i.e., in the middle of the width of the contact surfaces as measured in the direction perpendicular to the direction of sliding movement of the recording medium. In erasing head cores as indicated at 112, a middle groove (recess) 118 is formed in the middle of the width of contact surfaces through the opposed end portions of the core elements 102, 104 so that the middle groove 118 defines the two tracks 116 on both of its sides. The side grooves 118 or the middle groove 118 are/is filled with glass 120 to protect the track or tracks 116, and prevent breakage or chipping of corner portions of the grooves. In each of the ferrite cores 106, 108, 110 and 112, a coil-winding aperture 122 is formed between the core elements 102, 104.

In the aforementioned composite magnetic head cores wherein the middle groove 118 or side grooves 118 define the width w of the track or tracks 116, the grooves 118 are formed in both of the opposed portions of the core elements 102, 104, over a relatively long distance. Further, all of the core elements 102, 104 should be processed, prior to bonding thereof, to form recesses or cutouts which eventually form the grooves 118 when the core elements 102, 104 are bonded together. This requires repetitive cutting operations on the individual core elements 102, 104, and requires accurate control of the widths of the recesses and spacings between the recesses, so that the two halves of each track 116 are exactly aligned with each other to provide the predetermined width w on both of the core elements 102, 104.

An exemplary process of manufacturing ferrite cores used to form a composite magnetic head core as introduced above is disclosed in Japanese Patent Aplication laid open in 1976 under Publication No. 51-96308. This process comprises the steps of: cutting slanted or straight grooves in each of a pair of ferrite core elements in the form of blocks; melting a glass material to fill the grooves with the molten glass; finely grinding surfaces of the core elements defining a magnetic gap; cutting a groove in one of the core elements so as to define a central aperture for winding coils; applying a layer of glass of a suitable thickness, with a sputtering method, to at least one of the surfaces defining the magnetic gap; assembling the two core elements in a mutually abutting relationship; and heating the assembly to bond the two core elements to obtain an integral ferrite core structure. Thus, ferrite core structures are produced. Then, a pair of these core structures are bonded together with bonding glass, whereby a desired composite magnetic head core is manufactured.

Figure 3E:
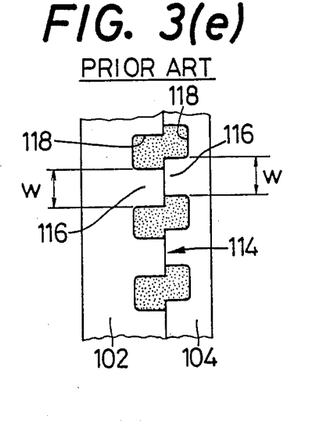
FIG. 3(e) is a fragmentary plan view of these known composite cores, showing misalignment of core elements at the top of the core on which tracks are formed.
Figure 3F:
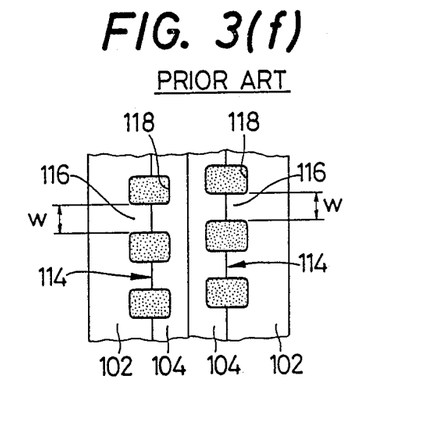
FIG. 3(f) is a fragmentary plan view of a composite core structure, showing misalignment of tracks on two elongate core assemblies.

Such a known manufacturing process as described above, however, is very complicated and cumbersome. Apparently, the individual grooves or cutouts formed in the core elements should be accurately cut to tight dimensional tolerances. Further, the processed core elements with the grooves should be precisely aligned with each other upon assembling the blocks in a mutually abutting relationship. This is also an extremely troublesome and difficult step. If the relative alignment of the core elements is not sufficiently accurate, two halves of each track 116 are displaced laterally from each other as depicted in FIG. 3(e). This alignment error will reduce the quality of the ferrite cores, and consequently results in degrading the quality of the composite core using the ferrite cores. In addition, even if the core elements are accurately aligned with each other, it is further necessary to accurately align the two ferrite cores, otherwise the tracks on one of the ferrite cores are not aligned with the tracks on the other ferrite core as shown in FIG. 3(f).

Figure 4:
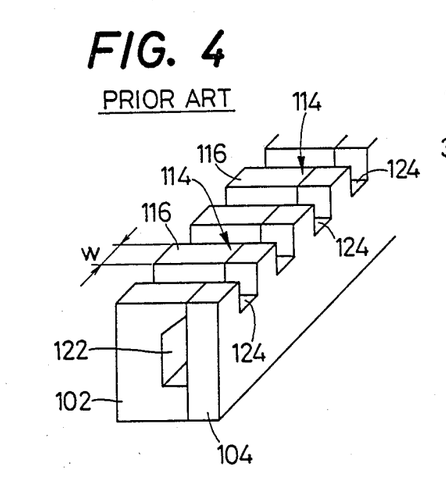
FIG. 4. is a perspective view of a known elongate core assembly prepared according to a known method.

Also known in the art is a ferrite core which is formed with grooves 124 which, unlike the above discussed grooves 118, are formed in parallel with the track 116 as shown in FIG. 4.

This ferrite core is produced by bonding two ferrite core elements 102, 104 into an integral assembly, and then cutting the grooves 124 in the opposed portions of the core elements 102, 104 defining magnetic gaps 114, such that the grooves 124 are formed on both sides of and in parallel with the track 116 in order to define the track 116 with a desired length and a desired width w. Since these grooves 124 should have a depth sufficient to reach a central coil-winding aperture 122, the uncut portions (lands) of the core elements 102, 104 providing the track 116 and defined by the deep parallel grooves 124 tend to have a relatively large height relative to its width, as previously indicated in association with the grooves 20 of FIG. 2(d). In other words, it is hard to form the track 116 as intended, without breakage or chipping of the uncut portions during the cutting of such deep grooves. This problem is serious when the width w of the track 116 is relatively small.

SUMMARY OF THE INVENTION

The present invention was developed in view of the foregoing state of the prior art. It is accordingly an object of the invention to provide a high-quality composite magnetic head core which is easy to manufacture, and which consists of two ferrite cores, each consisting of two ferrite core elements which are bonded together into a generally ring-shaped integral core assembly.

According to the present invention, there is provided a composite magnetic head core, comprising: (a) a first integral core assembly and a second integral core assembly, each of the first and second integral core assemblies including a first ferrite core element having a C-shaped portion, and a second ferrite core element having a rectangular portion, the first and second ferrite core elements being butted and bonded together, so as to close an opening of the C-shaped portion with the rectangular portion, to thereby form a generally annular magnetic circuit which includes a magnetic gap of a predetermined width defined by opposed end portions of the first and second core elements at one end of a corresponding one of the first and second integral core assemblies, the magnetic gap being formed transversely across an annulus of the magentic circuit, each of the first and second integral core assemblies having at least one inclined groove cut in the opposed end portions of the first and second ferrite core elements to define a width of at least one track, the at least one inclined groove being formed in a direction from the opposed end portion on the second second core element toward the opposed end portion on the first ferrite core element, such that a bottom portion of the inclined groove is inclined with its depth decreasing toward the first ferrite core element and such that a depth of the inclined groove at the position corresponding to the magnetic gap is greater than a depth of the magnetic gap; (b) an adhesive layer disposed between the second core elements of the first and second integral core assemblies, to bond the first and second integral core assemblies at the second core elements thereof, such that the above-indicated at least one inclined groove in the first integral core assembly is maintained in a predetermined positional relationship with the above-indicated at least one inclined groove in the second integral core assembly in a direction along the length of the above-indicated at least one track; and (c) a filler filling the above-indicated at least one inclined groove in the first integral core assembly and the above-indicated at least one inclined grove in the second integral core assembly.

In the composite magnetic head core of the present invention as described above, the inclined groove or grooves defining the track or tracks is/are cut in each of the first and second integral core assemblies, each assembly consisting of two ferrite core elements bonded together to form a generally annular magnetic circuit. Therefore, it is by no means necessary to process the individual core elements to form cutouts which eventually define a groove or grooves for a track or tracks when the two core elements are bonded together, as practiced in the prior art process. Stated differently, the inclined grooves ca be cut concurrently in both of the first and second ferrite core elements of each of the two integral core assemblies. This concurrent groove cutting eliminates the conventional need of positioning the first and second ferrite core elements for alignment of the track or tracks when the ferrite core elements are bonded together. Thus, the instant process is simplified.

Further, since the inclined grooves are open on the side of the second ferrite core elements which abut on each other when the first and second integral core assemblies are butted and bonded together by means of the adhesive layer. This arrangement permits easy alignment of the two core assemblies for establishing the intended positional relationship between the tracks on the two core assemblies. Accordingly, otherwise possible misalignment of the core assemblies as illustrated in FIG. 3(f) is effectively prevented.

Furthermore, the inclined grooves defining the tracks on the integral core assemblies do not have a large depth over the entire areas of the opposed end portions of the ferrite core elements providing the contact surfaces for a magnetic recording medium. In other words, the uncut portions serving to provide the tracks have a relatively small height and therefore suffer from reduced or minimum breakage or chipping.

According to one feature of the invention, the adhesive layer and said filler is formed of a same glass material. In this case, the bonding of the two integral core assemblies by the adhesive layer, and the filling of the inclined grooves with the molten filler, take place concurrently. This concurrent filling and bonding operation means automatic completion of the bonding step by executing the step of filling the inclined grooves, and therefore makes it possible to eliminate one of such two otherwise different steps. In addition, the molten glass for filling the inclined grooves will never flow down over the side end surfaces of the C-shaped first ferrite core elements.

According to an alternative feature of the invention, however, the adhesive layer is formed of a first glass material, while said filler is formed of a second glass material different from said first glass material. In this case, the bonding of the two integral core assemblies, and the filling of the grooves are effected at different times.

According to a further feature of the invention, the adhesive layer is formed of an adhesive material other than a glass material used as the filler. For example, the adhesive material consists essentially of a resin or organic adhesive material.

According to a still further feature of the invention, the first and second ferrite core elements of each of the first and second integral core assemblies are directly bonded together at mutually abutting surfaces thereof, by a solid-solid reaction, so that the generally annular magnetic circuit is defined by the first and second ferrite core elements.

BRIEF DESCRIPTION OF THE DRAWING

The above and other objects, features and advantages of the present invention will become more apparent from reading the following description of the preferred embodiments taken in connection with the accompanying drawing in which:

FIGS. 6 (a) and 6(b) are perspective views of different forms of a composite core consisting of two cores of the invention;

DETAILED DESCRIPTION OF THE PREFERRED EMBODIMENTS

Figure 5A:
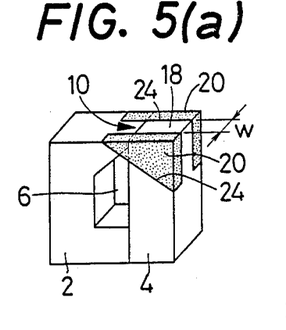
FIGS. 5(a) and 5(b) are perspective and elevational views, respectively, showing one embodiment of the ferrite magnetic head core of the invention.
Figure 5B:
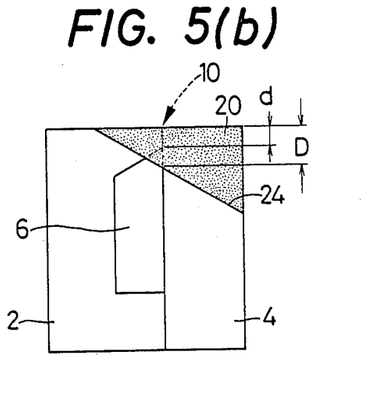

Referring to FIGS. 5(a) and 5(b), there is shown an example of the ferrite magnetic head core of the invention, wherein a C-shaped ferrite core element 2 and a rectangular ferrite core element 4 are bonded together into an integral core assembly, and the core assembly is subjected to a groove-cutting operation wherein two inclined grooves 24, 24 are cut from the side of the rectangular core element 4, such that the bottom of the grooves 24, 24 is slanted upwardly at a predetermined angle toward the C-shaped core element 2. As a result of the formation of these two inclined grooves 24, 24, a track 18 having a desired width w is formed between the grooves 24, 24.

The inclined grooves 24, 24 described above are formed with ease after the ferrite core elements 2, 4 have been bonded together into the integral core assembly. This eliminates the need for forming cutouts in each of the individual core elements 2, 4 before they are bonded together. That is, the inclined grooves 24, 24 are formed at one time in the single core assembly of the two elements 2, 4, whereby the groove-cutting process is remarkably simplified. Further, the concurrent cutting of the two inclined grooves 24, 24 removes the positioning of the core elements 2, 4 to establish alignment of two halves of the track 18 on the originally separate core elements 2, 4. Accordingly, the possibility of misalignment trouble, as shown in FIG. 2(c), is totally removed, whereby the quality of the ferrite core is stabilized.

In the present invention, the angle of inclination of the inclined grooves 24, 24 is properly determined depending upon the depth d of the magnetic gap, thickness of the core element 4 (2) in the direction of the width w, etc. In the illustrated example of FIGS. 5(a) and 5(b) consisting of a combination of the C-shaped and rectangular core elements 2, 4, it is preferred that the grooves 24, 24 be cut in the direction from the rectangular core element 4 toward the C-shaped core element 2, such that the depth D of the grooves 24, as measured at the position of the magnetic gap 10, is greater than the depth d of the magnetic gap 10. The reason for this lies in that the grooves 24 having the depth D smaller than the depth d do not substantiate a stock removal of the core elements sufficient to define the effective width w of the track 18 at the magnetic gap 10.

Figure 6A:
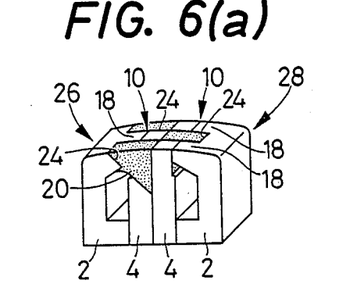
Figure 6B:
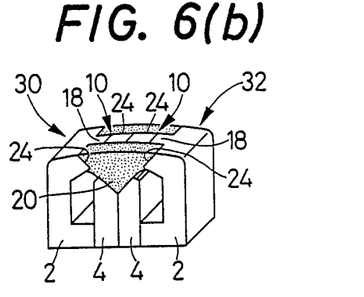

In the ferrite magnetic head core wherein the track width is determined by the inclined grooves 24, no deep grooves are cut over the entire length of the contact surface with which a magnetic recording medium slidably contacts. That is, it is not necessary to form a relatively high land to provide a track. Therefore, the conventionally experienced breakage or chipping of the track 18 is effectively eliminated or minimized. In addition, a mass of glass 20 in the molten phase to fill the inclined grooves 24 will not flow over the end surface of the C-shaped core element 2 (beyond the left ends of the grooves, as seen in the figures). In particular, the trouble of flow of the glass 20 is more effectively solved in the case where the invention is embodied in the form of a composite magnetic head core as depicted in FIGS. 6(a) and 6(b). Stated in greater detail, a composite ferrite core of FIG. 6(a) is an integral core assembly consists of a ferrite writing/reading (recording/reproducing) head core 26, and a ferrite erasing head core 28, while a composite ferrite core of FIG. 6(b) is an integral core assembly consisting of a ferrite writing head core 30, and a ferrite reading head core 32. In these composite cores, the separate cores 26 and 28, or 30 and 32 are butted together at the rectangular core elements (4), such that the inclined grooves 24 in the separate cores are closed at their ends by the surfaces of the rectangular core elements (4) or aligned with each other to cooperate to form Vee-shaped grooves, as shown in FIG. 6(b). In this condition, the bonding of the separate cores 26, 28, and 30, 32 is effected, and the molten glass 20 is poured into the grooves 24, or Vee-shaped grooves defined by the grooves 24. Accordingly, the sidewise leakage or flow of the glass 20 is substantially eliminated.

In the present invention, the ferrite core assembly which consists of a plurality of core elements and in which the inclined grooves 24 are formed, is obtained by bonding the core elements with a suitable bonding glass as used in a conventional manufacturing process, and thereby forming an integral ring-shaped structure having an annular mangentic circuit. However, it is possible to form such an integral ring-shaped structure by directly boding the core elements by means of solid-solid reaction or solid-phase reaction at the abutting surfaces of the core elements.

Figure 7:
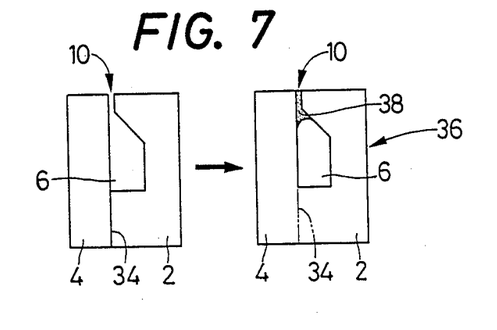
FIG. 7 is a view illustrating the process of assembling one form of the core of the invention.

For example, two core elements 2, 4 made of ferrite are butted together to form a generally ring-shaped structure with a generally annular magnetic path (magnetic circuit), as shown in FIG. 7. Then, the abutting portions (surfaces) 34 of the two core elements 2, 4 are directly bonded together by means of solid-solid reaction. As a result, an ring-shaped integral assembly 36, as shown on the right-hand side of FIG. 7, is obtained with substantially no interface boundary (34) present between the two core elements. In this integral core assembly 36, a magnetic gap 10 is formed between opposed surfaces of the two core elements at one end of the assembly 36, while the two elements define a centrally located void or opening serving as a coil-winding aperture 6 for facilitating winding of coils. Subsequently, molten glass 10 is used to fill the magnetic gap 10 for protective purposes.

The two ferrite core elements 2, 4 are butted and bonded together by a solid-solid reaction, preferably in the following manner. At first, a ferrite-dissolving acid such as hydrochloric acid, nitric acid or sulfuric acid is applied to the mutually abutting surfaces of the elements. Then, the core elements 2, 4 are butted together and heated for a suitable period of time at an elevated temperature, preferably not lower than about 1100° C., in an atmosphere whose oxygen partial pressure is equal to that of the ferrite, i.e., in the atmosphere having an equilibrated oxygen partial pressure. The application of the ferrite-dissolving acid to the abutting surfaces is intended to form salts of the ferrite component such as iron nitrate, manganese nitrate and zinc nitrate, which serve to secure the core elements 2, 4 relative to each other, and which are decomposed into oxides upon subsequent heat application. These oxides function to accelerate the solid-solid or solid-phase reaction of the core elements 2, 4, which results in the bonding of the two elements. In place of the above indicated acids, it is possible to use a solution of inorganic salts including a ferrite component, which solution produces almost the same effects and results as the above indicated acids, upon abutting bonding of the two core elements 2, 4.

The integral core assembly 36 thus prepared through abutting bonding by means of solid-solid reaction has a substantially integrated structure without a heterophase at the abutting portions (34). The solid-solid reaction bonding of the core elements permits substantial elimination of a rear gap or back gap (indicated at 14 in FIG. 3) which is inevitably present between the abutting portions (34) if bonded together with bonding glass as practiced in the prior art. Accordingly, the magnetic circuit is made substantially free from magnetic resistance due to the existence of such a rear gap. Thus, the present invention provides an effective measure to improve sensitivity and S/N ratio of the magnetic head.

While it is possible to bond the ferrite core elements 2, 4 with glass, it is preferred that the temperature at which such bonding glass becomes molten be higher than the melting temperatures of glass 38, 20 which are used in the subsequent steps to fill the magnetic gap 10 and the inclined grooves 24, respectively.

Since the ferrite core elements are heated when the glass is melted by heating, usually to a temperature within a range of 600°-900° C., the heating should be conducted in an atmosphere which is neutral to the ferrite, or in an atmosphere of equilibrated oxygen partial pressure, so that the properties of the ferrite are not deteriorated by heat.

Figure 8:
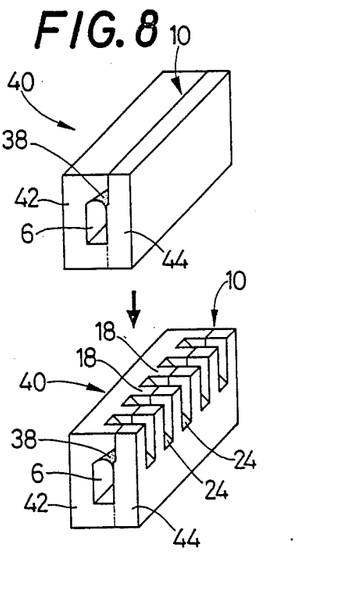
FIG. 8 is a view illustrating the process of manufacturing the cores of the invention according to one preferred embodiment of the process of the invention.

While the above illustrated specific examples are associated with the production of a single ferrite core from the core elements 2, 4, it is appreciated and advantageous, from the standpoint of production efficiency, to manufacture the ferrite cores of the invention in a manner which will be described below referring to FIG. 8.

To begin with, two elongate planar workpieces of ferrite are prepared as starting materials. These workpieces are processed to prepare an elongate block (bar) 42 of a C-shaped cross section, and an elongate block (bar) 44 of a rectangular cross section. Successively, these elongate blocks 42, 44 are butted together so that a magnetic gap 10 is formed between opposed end portions of the blocks 42, 44 at one end of the assembly. Then, the two blocks 42, 44 are bonded together into an elongate integral ferrite structure 40 of a generally ring-shaped cross section. In the next step, the integral structure 40 is subjected to a process of forming a plurality of inclined grooves 24 from one of the two blocks (from the rectangular block 44 in this example), so that the inclined grooves 24 are evenly spaced from each other by a predetermined distance along the length of the elongate integral structure 40. As a result, a plurality of tracks 18 defined by the inclined grooves 24 are formed in a spaced-apart relationship with each other in the longitudinal direction of the elongate integral structure 40.

The thus obtained elongate integral ferrite structure 40 with the grooves 24 is cut in parallel planes which are spaced apart from each other along the length of the structure 40 and perpendicular to the length, whereby a plurality of ferrite cores of the same dimensions are produced. As described in greater detail, it is possible to bond two elongate ferrite structures 40 to form an elongate composite structure, which is cut in the same manner as indicated above. In this instance, plural composite ferrite cores are obtained. The cutting operation may be performed either before or after the inclined grooves 24 are filled with protective glass.

Further, a ferrite core of the invention having an annular magnetic path (circuit) may consists of three or more ferrite core elements, rather than a pair of core elements used in the illustrated embodiments. Of course, it is possible to change the shape of the individual ferrite core elements used in combination to constitute a ferrite core of the invention.

As described hitherto, the instant magnetic head core which is an integral core assembly of two or more ferrite core elements which are bonded together so as to provide a generally annular or toric magnetic circuit, is provided with a track defined by at least one groove which is formed in the integral core assembly so as to be inclined from one of the two core elements defining a magnetic gap, toward the other. Hence, the core is easy to manufacture, simple in construction, subject to minimum breakage or chipping of the track and its vicinities, and free from relative misalignment of the core elements which cause misalignment between the two halves of the track, thereby assuring significant improvement in quality, and increased consistency in quality between the individual magnetic head cores.

Referring next to FIGS. 9-12, a process of manufacturing a composite magnetic head core will be described in detail.

At first, it is noted that ferrite core elements used to form core assemblies according to the invention are made of ferrite materials such as Mn-Zn ferrite and Ni-Zn ferrite, which are selected depending upon the specific applications of the core assemblies (composite ferrite cores). As a rule, the core elements of a core assembly are made of the same ferrite materials. Further, the crystal structure of ferrite of the core elements may be a single crystal or a polycrystal, or a composite of a single crystal and a polycrystal. It is possible that the core of the invention be made from ferrite core elements of mutually different crystal structures in combination.

Figure 9:
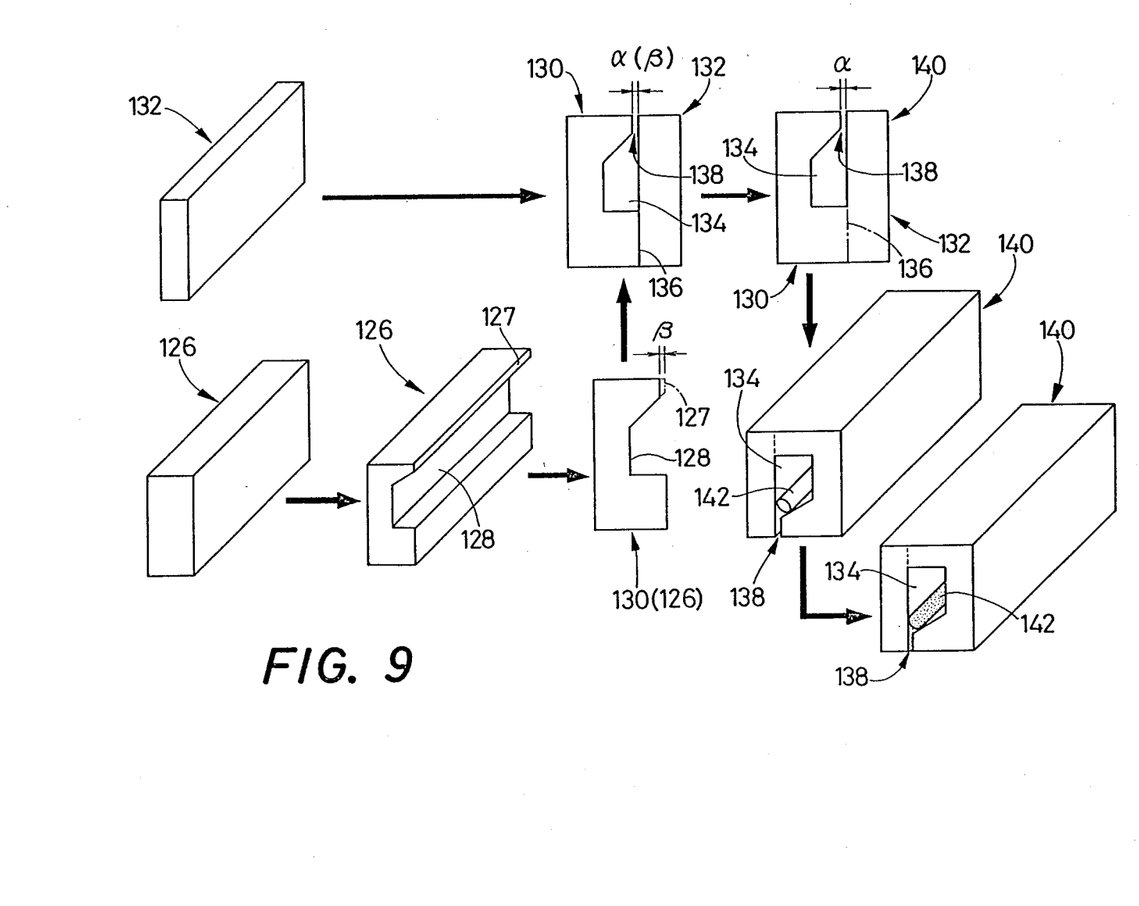
FIG. 9 is a view illustrating one embodiment of a process of the invention for manufacturing an elongate magnetic head core.

According to the invention, a ferrite block of a C-shaped cross section, i.e., a first core element 130, and a ferrite block of rectangular cross section, i.e., a second core element 132, are first butted together so as to close the C-shaped opening of the first core element 130 with the flat surface of the second core element 132 and thereby define a coil-winding aperture 34 between the first and second core elements 130, 132, as illustrated in FIG. 9. Mutually abutting surfaces (portions) 136 of the two core elements 130, 132 are then bonded together to form an annular magnetic path (circuit). Moreover, a magnetic gap 138 having a predetermined width α is defined between opposed end portions of the core elements 130, 132 at their one end, such that the magnetic gap 138 is formed transversely across the annulus of the magnetic circuit. Thus, an intended elongate ferrite core assembly 140 is prepared.

The first core element 130 of the C-shaped cross section is prepared by cutting a groove 128 and then forming a gap-defining surface 127, in or on an elongate rectangular ferrite block 126, as shown in the figure. The groove 128 is cut along the length of the block 126 to define the coil-winding aperture 134 in cooperation with the second core element 132. The gap-defining surface 127 is formed by removing stock from the ferrite block 126 to a suitable depth β, for example by chemical etching with an acid, or by grinding with a diamond blade. While the C-shaped, first core element 130 is subjected to a process of forming the gap-defining surface 127 the rectangular second core element 132 may be ground or chemically etched to provide a gap-defining surface. In short, the magnetic gap 138 is defined by and formed between a pair of opposed portions of the first and second core elements 130, 132 at their one end, while another pair of opposed portions at the other end of the elements 130, 132 have mutually abutting surfaces 136 which are bonded together so as to form the elongate integral ferrite core assembly 140 of a generally ring-shaped transverse cross section.

In the process of the invention, a suitable bonding glass may be used, according to a known method, to bond the first and second ferrite core elements 130, 132 to prepare the integral ferrite core assembly 140 with a generally annular magnetic circuit. However, it is advantageous to induce solid-solid reaction at the boundary interface, i.e., at the mutually abutting surfaces 136 of the first and second core elements 130, 132 to directly bond these elements together into the ring-shaped assembly 140. This direct bonding by means of solid-solid reaction or solid-phase reaction at the abutting surfaces (136) permits the core assembly 140 to have a substantially continuous structure without a hetero-phase at the boundary interface between the first and second core elements 130, 132.

The two ferrite core elements 130, 132 are butted and bonded together through a solid-solid reaction, preferably in the following manner. At first, a ferrite-dissolving acid such as hydrochloric acid, nitric acid or sulfuric acid is applied to the mutually abutting surfaces of the elements. Then, the core elements 130, 132 are butted together and heated for a suitable time at an elevated temperature, preferably not lower than about 1100° C., in an atmosphere whose oxygen partial pressure is equal to that of the ferrite, i.e., in an atmosphere having an equilibrated oxygen partial pressure. The application of the ferrite-dissolving acid to the abutting surfaces is intended to form salts of the ferrite component such as iron nitrate, manganese nitrate and zinc nitrate, which serve to secure the core elements 30, 32 relative to each other, and which are decomposed into oxides upon subsequent heat application. These oxides function to acclerate the solid-solid or solid-phase reaction of the core elements 130, 132 which results in the bonding of the two elements. The above indicated acids may be replaced by a solution of inorganic salt including a ferrite component, which solution produces almost the same effects and results as the above indicated acids, upon abutting bonding of the two core elements 130, 132.

In the integral ferrite core assembly 140 which is prepared by directly bonding the first and second core elements 130, 132 by means of solid-solid reaction, there is no hetero phase present at the boundary iterface (136), that is, each one of the core elements is a substantially integral part of the other. Unlike the bonding of the core elements 130, 132 with bonding glass, the direct solid-solid reaction bonding thereof permits substantial elimination of a rear or back gap which is inevitably present between the rear opposed portions of the core elements 130, 132 if bonded together with glass. Accordingly, the magnetic circuit is made substantially free from magnetic resistance due to the existence of such a rear gap. Thus, the sensitivity and S/N ratio of the magnetic head are improved.

In the case where the ferrite core elements 130, 132 are bonded directly by means of solid-solid reaction, the gap-defining surface 127 must be subjected to a stock removal to a depth β as previously stated, before the two core elements are assembled in abutting relation.

When the ferrite core elements 130, 132 are bonded with glass as previously indicated, a spacer of an appropriate thickness β is formed, as with a sputtering method, on the gap-defining surface 127 on the C-shaped first or rectangular second core element 130 or 132, and then the two core elements are bonded together with suitable glass such that the magnetic gap 110 of a width β is formed between the gap-defining surfaces 127 of the two core elements. The magnetic gap 110 is filled with glass, as described later, after the core elements 130, 132 are bonded with glass. Since the glass bonding the two core elements is heated when later described inclined grooves for defining tracks are filled with glass, the temperature at which the bonding glass becomes molten should preferably be higher than the melting temperature of the glass used to fill the inclined grooves.

Because the ferrite core elements 130, 132 are heated when the glass is melted at a typical temperature of 600°–900° C., the heating should be conducted in an atmosphere which is neutral to the ferrite material, or in an atmosphere of equilibrated oxygen partial pressure, so that the properties of the ferrite will not be deteriorated by heating.

In the next step, a glass rod 142 is inserted into the coil-winding aperture 134 in the elongate integral ferrite core assembly 140 in order to fill the magnetic aperture 138. The glass rod 142 is located above the magnetic gap 138, and then heated so that the magnetic gap 138 is filled with molten glass to protect the gap during the subsequent steps of manufacture and during the service of the product.

Figure 10:
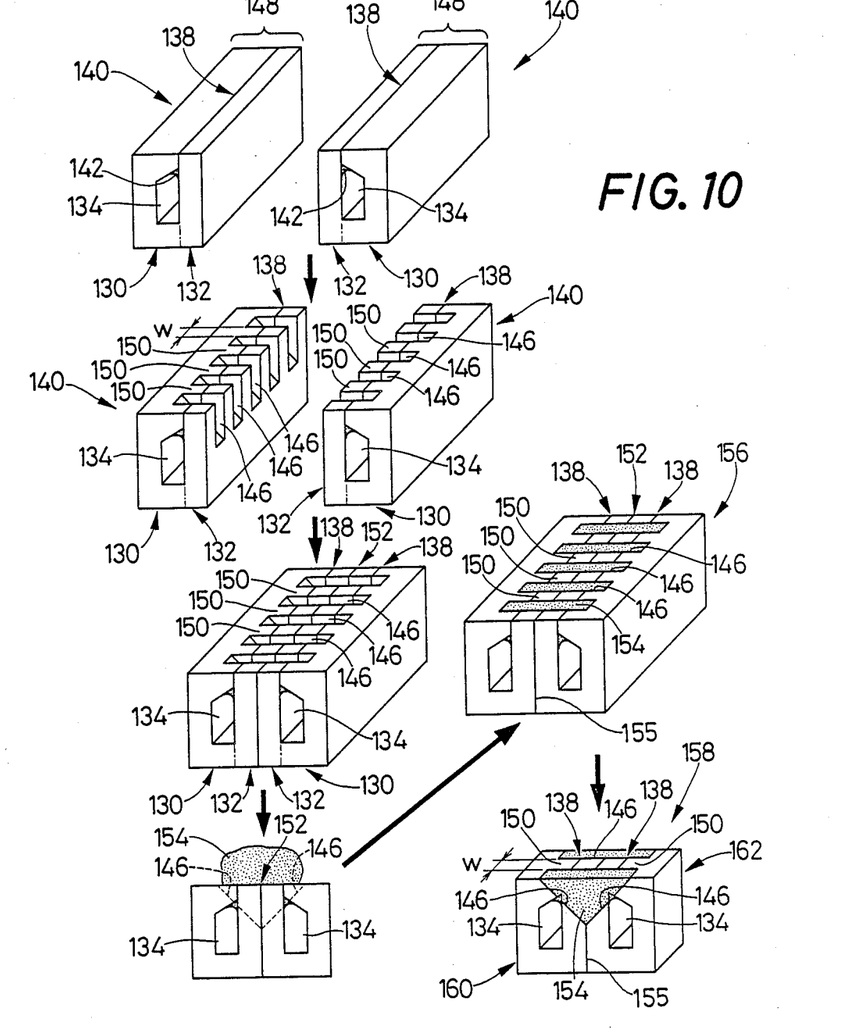
FIG. 10 is a view showing an exemplary process of the invention for manufacturing composite magnetic head cores using two ferrite core assemblies.

Successively, inclined grooves 146 are formed in the thus prepared ferrite core assembly 140, in parallel with each other, such that the grooves 146 are evenly spaced apart from each other at predetermined intervals (equal to the width of tracks 150 which will be described) in the direction along the length of the assembly 140, as shown in FIG. 10. The grooves 146 are cut in a corner portion of the assembly 140 in the vicinity of the magnetic gap 138, more precisely, in the opposed portions of the core elements 130, 132 that define the magnetic gap 138 and provide contact surfaces 148 on which a magnetic recording medium is moved in sliding contact. More specifically stated, the grooves 146 are formed in the direction from the portion of the rectangular second core element 132 on one side of the magnetic gap 138 toward the portion of the C-shaped first core element 130 on the other side of the magnetic gap 138, so that the bottom of the inclined grooves 146 is inclined with its depth decreasing toward the first core element 130. Each of the inclined grooves 146 is open at one end thereof in the side end surface of the second core element 132, and at the other end in the top surface of the first core element 130, i.e., in the contact surface 148.

The inclined grooves 146 cut in the corner portion of the ferrite core assembly 140 in the vicinity of the magnetic gap 138, serve to define the parallel tracks 150 which extend over a suitable distance between the first and second core elements 130, 132. As is apparent from the above description, each of the inclined grooves 146 is cut at one time in both of the opposed portions of the two core elements 130, 132 of the integral core assembly 140, there arises no problem of misalignment between the two halves of the tracks 150 on the respective core elements 130. 132.

Figure 11:
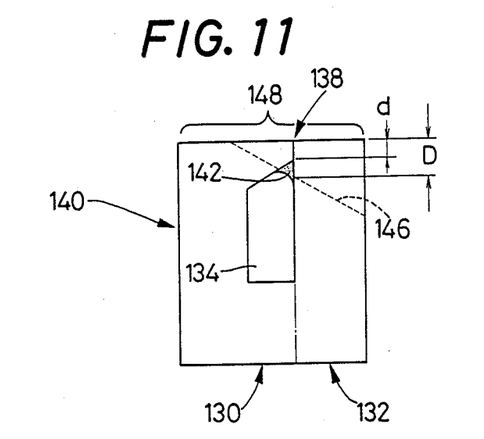
FIG. 11 is an elevational view corresponding to FIG. 5(b), showing a ferrite core assembly after inclined grooves are cut therein.

It is noted that the depth D of each inclined groove 146 at the position of the magnetic gap 138 should be greater than the depth d of the magnetic gap 138, as shown in FIG. 11. The reason for this lies in theat the grooves 124 having the depth D smaller than the depth d do not substantiate a stock removal of the core elements sufficient to determine the effective width w of the track 150 at the magnetic gap 138. The angle of inclination of the inclined grooves 146 is suitably selected depending upon the depth d of the magnetic gap 138, thickness of the second core element 132 (thickness of the magnetic circuit), etc.

Figure 12A:
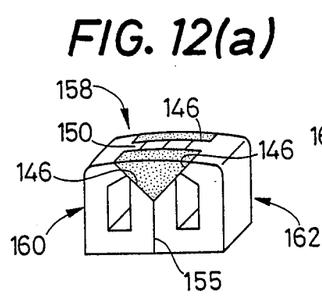
FIGS. 12(a) and 12(b) are perspective views corresponding to FIGS. 6(a) and 6(b), showing different forms of a composite magnetic head core produced according to the process of the invention.
Figure 12B:
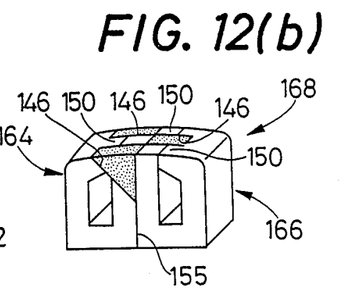

According to the instant process, an intended composite magnetic head core is produced by using the two ferrite core assemblies 140 which are provided with the inclined grooves 146. Stated in more detail, the two ferrite core assemblies 140 having a predetermined pattern of the inclined grooves 146, i.e., pattern of tracks 150, are butted together so that the rectangular second core elements 132 face each other with a suitable clearance 152 therebetween. This clearance 152 between the two core assemblies 140 is left to accommodate a layer of bonding glass, and usually held within a range of about 10-500 microns. When the two core assemblies 140 are butted together, they are positioned such that the inclined grooves 146 in one assembly 140 are held in a predetermined positional relation with those in the other assembly 140. In the embodiment of FIG. 10, the grooves 146 and consequently the tracks 150 of the two core assemblies 140 are completely aligned, so that individual composite cores obtained from the assembly of the two core assemblies 140 take the form of a composite core 158 illustrated in FIG. 12(a). Alternatively, the two core assemblies 140 may be assembled so as to obtain a composite core 168 consisting of a ferrite writing/reading head core 164 and a ferrite errasing head core 166 as shown in FIG. 12(b). In this instance, the inclined grooves 146 of the erasing head core 166 are disposed in a zigzag fashion with respect to the inclined grooves 146 of the writing/reading core 164.

After the two ferrite core assemblies 140, 140 are butted together as described above, a block of glass 154 is placed over the inclined grooves 146, and heated and melted so that the molten glass 154 flows into the grooves 146 and further into the clearance 152 between the two core assemblies 140, 140. Thus, the bonding of the two core assemblies is achieved concurrently with the filling of the grooves 146 with the glass. In FIG. 10, FIG. 12(a) and FIG. 12(b), reference numeral 155 designates an adhesive layer formed of the solidified molten glass 154. In the present embodiment, the glass material 154 is used to form the adhesive layer 154 for bonding the core assemblies into a composite magnetic head core, as well as a filler which fills the grooves 146.

Thus, an elongate composite core structure 156 is prepared by bonding of the two core assemblies 140, 140. The elongate structure 156 is cut with a suitabale means such as a diamond cutter, in parallel planes which are perpendicular to, and spaced apart from each other along, the length of the structure 156, as needed. More particularly, the elongate structure 156 is cut into a plurality of composite magnetic head cores 158 each of which includes at least one track 150 for magnetic association with a magnetic recording medium. The composite core 158 shown in FIG. 10 is a combination of a writing core head 160 and a reading head core 162.

The contact surfaces 148 of the composite core 158 in which the magnetic gaps 138 are formed, in other words, the top surface of the composite core 158, is finished as illustrated in FIG. 12(a), to a desired profile, usually to a convex shape of a suitable curvature, for effective and smooth sliding contact with the recording medium. An alternative form of a composite magnetic head core produced according to the invention is indicated at 168 in FIG. 12(b). This composite core 168 is a combination of the writing/reading head core 164 and the erasing head core 166 as previously indicated. The composite core 168 is produced in the same manner as the composite core 158.

Although the filler which fills the inclined grooves 146 and the adhesive layer 155 in the above embodiment are formed concurrently of the same glass material 154, it is possible that the two core assemblies 140, 140 are first bonded together by an adhesive layer of one glass material, and then the inclined grooves 146 are filled with a filler which consists of the same or other glass material. Further, the adhesive material may consists essentially of a resin or organic adhesive material. In this case, it is desirable that the grooves 146 are first filled with a suitable glass material, and the two core assemblies 140, 140 are subsequently butted and bonded together by an organic adhesive or other suitable adhesive materials other than a glass material.

Figure 13:
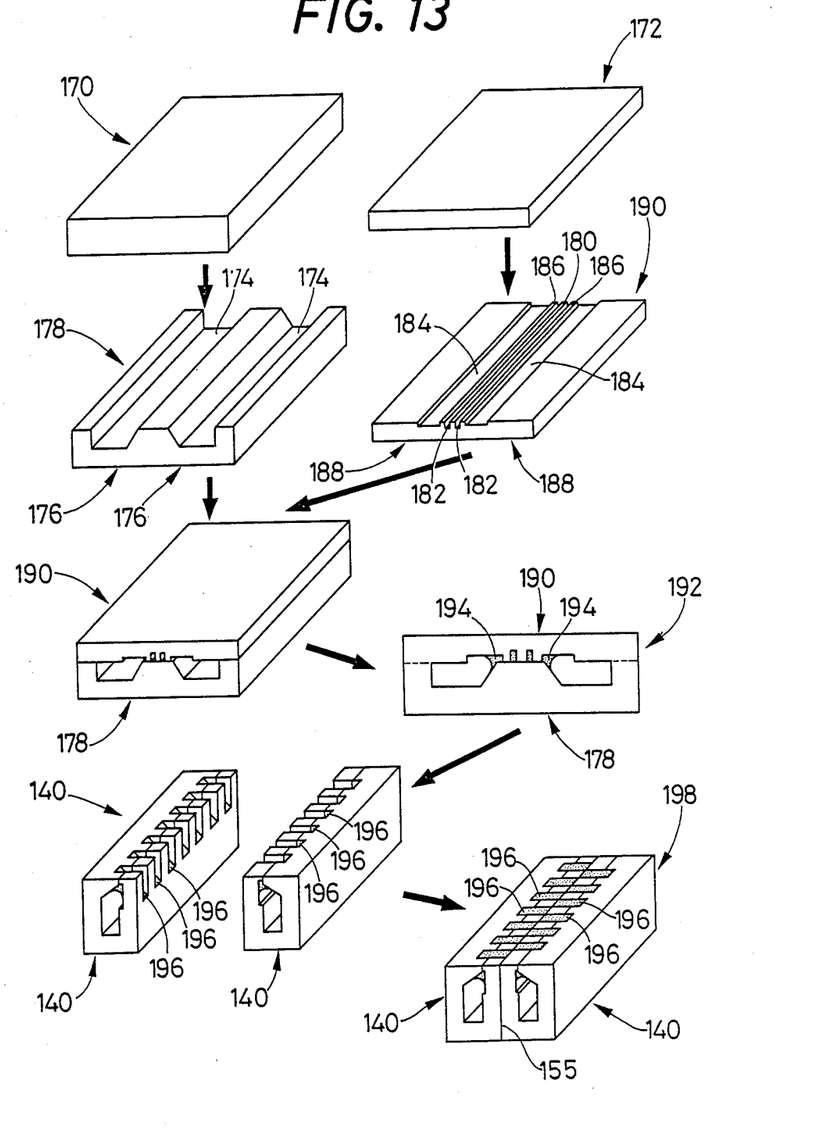
FIG. 13 is a view illustrating another embodiment of the process of the invention for producing composite magnetic head cores.

While the process of the invention has been described in detail referring to the specific examples of FIGS. 9 and 10, it is more advantageous to simultaneously prepare two elongate ferrite core assemblies in the manner as illustrated in FIG. 13.

In the figure, numerals 170, 172 designate rectangular plates of ferrite having dimensions sufficient to provide two C-shaped portions, and two corresponding rectangular portions, respectively. Two parallel grooves 174 for defining coil-winding apertures are cut in one of the opposite surfaces of the ferrite plate 170 along the length, in symmetric relation with each other, whereby a first ferrite member 178 having two symmetric C-shaped portions 176 is prepared.

In the meantime, two partition grooves 182 are cut in a middle portion of the other ferrite plate 172 so as to define a central protrusion 180 therebetween. Further, two auxiliary recesses 184 are formed parallel to the partition grooves 182. The partition grooves 182 and the auxiliary recesses 184 cooperate to define two parallel protrusions 186, which are subjected to a stock-removing process to remove a predetermined amount ($\beta$) of stock necessary to define a magnetic gap. These protrusions 186 serve as gap-defining surfaces. Thus, a second ferrite member 190 is formed with two rectangular portions 188 corresponding to the C-shaped portions 176.

Figure 14:
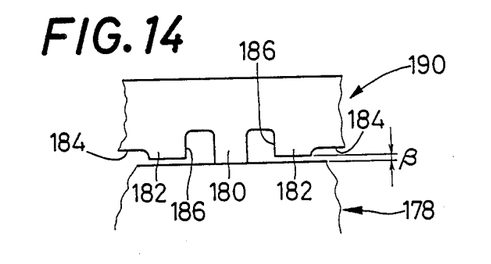
FIG. 14 is a fragmentary view showing elongate ferrite members of FIG. 13 in their mutually abutting condition.

The two ferrite members 178 and 190 are butted together as shown in FIG. 14, such that the central protrusion 180 of the second ferrite member 190 abuts on the first ferrite member 178, whereby magnetic gaps equal to the stock removal $\beta$ are formed between the first ferrite member 178 and the protrusions (gap-defining surfaces) 186 adjacent to the partition grooves 182. The two ferrite members 178, 190 in abutting contact with each other are then bonded together, preferably by means of a solid-solid reaction of the mutually abutting portions under heat. In this manner, an elongate integral twin-core assembly 190 is prepared, which includes two symmetrical magnetic circuits. The magnetic gaps in this twin-core assembly 190 are filled with glass 194.

Subsequently, the twin-core assembly 190 with the magnetic gaps filled with the glass 194 is cut into two halves along the central protrusion 180. These two halves correspond to the ferrite core assemblies 140, 140 of FIG. 10. These core assemblies 140, 140 are then subjected to a step of cutting inclined grooves 196 in the previously described manner, and bonded together into an elongate composite core structure 198 as shown in FIG. 13. In this embodiment, too, the same glass material is used as a filler filling the inclined grooves 196, and an adhesive layer 155 for bonding the two core assemblies 140, 140 together. However, a glass material different from the filler, or an organic adhesive material may be used as the adhesive layer 155, as previously described in connection with the embodiment of FIG. 10.

In the thus prepared composite core structure 198, the inclined grooves 196 in one of the core assembly 140 are disposed in a zigzag relation with respect to those in the other core assembly 140, so that each of the composite magnetic head cores to be obtained from the composite core structure 198 consists of a writing/reading head core and an erasing head core, as shown in FIG. 12(b). These composite magnetic head cores are finally produced by cutting the elongate composite core structure 190 in parallel planes perpendicular to its length.

As described above, the instant process of FIG. 13 permits simultaneous preparation of the two elongate ferrite core assemblies 140, 140 which are bonded together into the elongate composite core structure 198, which in turn is cut into the intended composite magnetic head cores.

While the present invention has been illustrated in its preferred embodiments, it is to be understood that the invention is not limited thereto; but it will be obvious that the invention may be otherwise embodied with various changes, modifications and improvements which may occur to those skilled in the art without departing from the scope and spirit of the invention.

What is claimed is:

1. A composite magnetic head core, comprising:

a first integral core assembly and a second integral core assembly, each of said first and second integral core assemblies including a first ferrite core element having a C-shaped portion, and a second ferrite core element having a rectangular portion, said first and second ferrite core elements being butted and bonded together, so as to close an opening of the C-shaped portion with the rectangular portion, to thereby form a generally annular magnetic circuit which includes a magnetic gap of a predetermined width defined by opposed end portions of the first and second core elements at one end of a corresponding one of said first and second integral core assemblies, said magnetic gap being formed transversely across an annulus of the magentic circuit;

each of said first and second integral core assemblies having at least one inclined groove cut in said opposed end portions of the first and second ferrite core elements to define a width of at least one track, said at least one inclined groove being formed in a direction from said opposed end portion on said second core element toward said opposed end portion on said first ferrite core element, such that a bottom portion of said at least one inclined groove is inclined with its depth decreasing toward the first ferrite core element and such that a depth of said at least one inclined groove at the position corresponding to said magnetic gap is greater than a depth of said magnetic gap;

an adhesive layer disposed between said second core elements of said first and second integral core assemblies, to bond the first and second integral core assemblies at said second core elements thereof, such that said at least one inclined groove in said first integral core assembly is maintained in a predetermined positional relationship with said at least one inclined groove in said second integral core assembly in a direction along the length of said at least one track; and a filler filling said at least one inclined groove in said first integral core assembly and said at least one inclined groove in said second integral core assembly.

2. A composite magnetic head core according to claim 1, wherein said adhesive layer and said filler are formed of a same glass material.

3. A composite magnetic head core according to claim 1, wherein said adhesive layer is formed of a first glass material, while said filler is formed of a second glass material different from said first glass material.

4. A composite magnetic head core according to claim 1, wherein said first and second ferrite core elements of each of said first and second integral core assemblies are directly bonded together at mutually abutting surfaces thereof, by a solid-solid reaction, whereby said generally annular magnetic circuit is defined by said first and second ferrite core elements.

5. A composite magnetic head core according to claim 1, wherein said adhesive layer is formed of an adhesive material other than a glass material.

6. A composite magnetic head core according to claim 5, wherein said adhesive material consists essentially of an organic adhesive material.

7. A composite magnetic head core according to claim 5, wherein said filler is formed of a glass material.

* * * * *